(12) United States Patent
Calis et al.

(10) Patent No.: US 8,465,565 B2
(45) Date of Patent: Jun. 18, 2013

(54) POLYETHYLENE MEMBRANE AND METHOD OF ITS PRODUCTION

(75) Inventors: Gijsbertus Hendrikus Maria Calis, Hulsberg (NL); Hendrik Derk Hoving, Susteren (NL)

(73) Assignee: Lydall Solutech B.V. (NL)

( * ) Notice: Subject to any disclaimer, the term of this patent is extended or adjusted under 35 U.S.C. 154(b) by 355 days.

(21) Appl. No.: 12/866,872

(22) PCT Filed: Feb. 20, 2009

(86) PCT No.: PCT/EP2009/001239
§ 371 (c)(1), (2), (4) Date: Aug. 11, 2010

(87) PCT Pub. No.: WO2009/103556
PCT Pub. Date: Aug. 27, 2009

(65) Prior Publication Data
US 2010/0313753 A1      Dec. 16, 2010

(30) Foreign Application Priority Data
Feb. 22, 2008   (EP) ................................. 08101870

(51) Int. Cl.
*B01D 46/10*    (2006.01)
*B01D 53/22*    (2006.01)
*B01D 71/26*    (2006.01)
*B01D 69/02*    (2006.01)

(52) U.S. Cl.
USPC ............. 55/487; 55/521; 55/522; 55/528; 95/45; 96/4; 96/12; 264/41; 264/210.1; 264/211.12

(58) Field of Classification Search
USPC ............. 95/45; 96/4, 11, 12; 55/486, 487, 55/521, 522, 528; 264/41, 210.1, 211.12
See application file for complete search history.

(56) References Cited

U.S. PATENT DOCUMENTS

| | | | |
|---|---|---|---|
| 4,588,633 A * | 5/1986 | Kono et al. | 428/220 |
| 4,696,748 A | 9/1987 | Nitadori et al. | |
| 5,051,183 A | 9/1991 | Takita et al. | |
| 5,370,889 A | 12/1994 | Fortuin et al. | |
| 5,376,445 A * | 12/1994 | Fortuin et al. | 428/339 |
| 5,507,847 A | 4/1996 | George et al. | |
| 5,507,993 A | 4/1996 | Fortuin et al. | |
| 6,153,133 A * | 11/2000 | Kaimai et al. | 264/41 |

(Continued)

FOREIGN PATENT DOCUMENTS

| | | |
|---|---|---|
| EP | 1090676 A1 | 4/2001 |
| WO | 9604063 A1 | 2/1996 |

(Continued)

OTHER PUBLICATIONS

Airguard Industries Microguard 99 HEPA and ULPA Filters, 2000, 2 pages, Filter Warehouse Company.

(Continued)

*Primary Examiner* — Jason M Greene
(74) *Attorney, Agent, or Firm* — Cantor Colburn LLP

(57) ABSTRACT

The invention relates to a porous membrane having a particle filtration value of at least 10 under U.S. Military Standard MIL-STD-282 (1956), where the porous membrane is a polyethylene membrane. The membranes according to the invention are particularly useful for filters such as ASHRAE filters, HEPA filters and ULPA filters for example in heating, ventilating, respirators and air conditioning applications.

17 Claims, 6 Drawing Sheets

U.S. PATENT DOCUMENTS

| | | | |
|---|---|---|---|
| 6,409,785 | B1 | 6/2002 | Smithies et al. |
| 6,416,562 | B1 * | 7/2002 | Shibuya et al. ................. 55/521 |
| 7,323,274 | B1 * | 1/2008 | Samii et al. ................... 429/251 |
| 2005/0098913 | A1 * | 5/2005 | Funaoka et al. ................ 264/41 |
| 2006/0103055 | A1 * | 5/2006 | Hoshuyama et al. ......... 264/479 |
| 2006/0272499 | A1 * | 12/2006 | Miller et al. ...................... 95/45 |
| 2007/0221567 | A1 * | 9/2007 | Simmons et al. ........ 210/500.36 |
| 2010/0305217 | A1 * | 12/2010 | Qiu et al. ........................... 95/45 |
| 2011/0223486 | A1 * | 9/2011 | Zhang et al. ................. 429/247 |

FOREIGN PATENT DOCUMENTS

| | | | |
|---|---|---|---|
| WO | WO 02/072248 A1 * | 9/2002 | |
| WO | 2007037289 A1 | 4/2007 | |
| WO | 2009103556 A1 | 8/2009 | |

OTHER PUBLICATIONS

ASHRAE, "Heating, ventilating, and air-conditioning systems and equipment," ASHRAE Handbook, 1992, pp. 25.3-25.5 and cover page.

DTIC Online, Advanced Search, 1 page, Defense Technical Information Center.

Foreign Communication from a related counterpart application—Extended European Search Report, 08101870.7-2113, Jul. 23, 2008, 6 pages.

Foreign Communication from a related counterpart application—International Search Report, PCT/EP2009/001239, May 20, 2009, 5 pages.

Foreign Communication from a related counterpart application—International Preliminary Report on Patentability, PCT/EP2009/001239, Sep. 2, 2010, 8 pages.

"International standards: filters for buildings and gas turbines," Filtration + Separation, Sep. 2005, 4 pages.

MIL-STD-282, "Filter units, protective clothing, gas-mask components and related products: performance test methods," Department of Defense Test Method Standard, May 28, 1956, 79 pages, US Department of Defense.

O'Rourke, Brian, "Indoor Firing Range Ventilation System," Heating/Piping/Air Conditioning, Oct. 1992, pp. 77-79 and 5.

SB 740-94-4, "Collective protection equipment, chemical-biological and ancillary items," Technical Manual, Storage Serviceability Standards, Feb. 1987, 73 pages, Headquarters, Department of the Army.

* cited by examiner

POLYETHYLENE MEMBRANE AND METHOD OF ITS PRODUCTION

CROSS-REFERENCE TO RELATED APPLICATIONS

This application is a filing under 35 U.S.C. 371 of International Application No. PCT/EP2009/001239 filed Feb. 20, 2009, entitled "Polyethylene Membrane and Method of its Production," claiming priority of European Patent Application No. 08101870.7 filed Feb. 22, 2008, which applications are incorporated by reference herein in their entirety.

FIELD OF INVENTION

The invention relates to a membrane comprising polyethylene. Particularly, the invention relates to a membrane having a PF (performance filtration) value of more than 20. Furthermore, the invention relates to methods for making and using such membranes.

BACKGROUND OF INVENTION

Gas filtration media are typically used for air filtration and used in a number of applications such as ASHRAE filters (also known as pre-filters), HEPA (high efficiency particulate air) filters and ULPA (ultra low penetration air) filters. Such filters may for example be used for removing contaminations in clean rooms, for HVAC (heating, ventilating and air conditioning) systems, for protecting equipment, such as medical equipment, from contaminants.

A HEPA filter is typically defined as a filter which removes at least 99.97% of particles having a mean diameter of approximately 0.3 µm as measured by the DiOctyl Pthalate (DOP) test outlined in U.S. Military Standard MIL-STD-282 (1956), incorporated by reference herein, and U.S. Army document 136-300-175A (1965), incorporated by reference herein. Other equivalent standard test methods to generate sub-micron aerosol particles of size distribution centered on 0.3 micron mass-median diameter include, but are not limited to, British, French and European test protocols.

Moreover, the MIL-STD-282 test is also outlined in the American Society of Heating, Refrigeration and Air-Conditioning Engineers (ASHRAE) Handbook of HVAC Systems, 1992, Chapter 25, pp. 25.3-25.5, incorporated by reference herein. In the ASHRAE Handbook at Chapter 25, various filters are classified in FIG. 4. In the preferred embodiment of the present invention, a high efficiency particulate air HEPA filter having 95% efficiency by the DOP MIL-STD-282 test is classified as Group IV in FIG. 4 of the ASHRAE Handbook.

Organic polymer based air filtration media based on PTFE are also available on the market and have been disclosed in a range of patent applications. However, PTFE media are typically rather fragile and hence require careful handling during manufacturing operation such as pleating or assembly or use and shaping as well as extensive support during use. For practical applications, PTFE does not have the strength to be used as a freestanding membrane.

U.S. Pat. No. 5,507,847 and WO 96/04063 discloses an ULPA filter having a PTFE membrane. The membrane is supported both upstream and downstream by one or more support materials. Other membrane materials than PTFE are suggested, but those membrane materials are not supported by experimental work and hence never reduced to practice.

U.S. Pat. No. 6,409,785 discloses a HEPA filter having two filter layers of which at least one is PTFE, wherein the second filter layer is intended to reduce the disadvantages of PTFE, which during the pleating operation tends to introduce cracks or tears in the PTFE membrane.

It should be observed that when the choice of material is discussed in patent applications in this field, polyethylene is sometimes suggested, but useable HEPA quality membranes of PE were until now never realized or reduced to practice in the art.

OBJECT OF THE INVENTION

It is the object of the invention to provide an improved polyethylene membrane, having a high particle filtration.

It is another object of the invention to provide a method of manufacturing the improved polyethylene membrane.

It is yet another object of the invention to provide advantageous uses for such a membrane.

The improvement may for example be to solve one or more of the above mentioned problems.

SUMMARY OF THE INVENTION

One or more of the above objects was realized by a porous membrane having a particle filtration, PF, with a value of at least 10. The PF value is calculated according to the formula:

$$PF = (-\log(\text{Penetration }(\%)/100)/\text{Pressure loss (mm } H_2O)) \times 100,$$

in which the penetration (%)=100−Collection efficiency at a Pressure loss in $mmH_2O$ measured when air is flowing through the membrane at a flow velocity of 5.3 cm/second and a collection efficiency (in %) measured using dioctyl phthalate having a particle size of 0.3 µm. This corresponds to the U.S. Military Standard MIL-STD-282 (1956). Surprisingly, this is realized by a porous polyethylene membrane. Such membranes are particularly useful in particle filtration applications such as ASHRAE filters, HEPA filters and ULPA filters. Until now it has only been feasible to utilize polyethylene membranes as support members in such applications and not as the filtering element itself.

It should be observed that the PF value is also known in the art as the "Figure of Merit", α value, or the "Quality Factor", γ value.

Penetration is defined as the amount not stopped by the membrane. The Penetration is expressed as a percentage and defined as $C_D/C_U$, where the particle concentration on the upstream side is $C_U$ and particle concentration on the downstream side is $C_D$. The collection efficiency is defined as 100%−Penetration. While the PF value does not directly give the Collection efficiency, the membranes according to the invention typically have a Collection efficiency of at least 50% (ASHRAE filters) and in most cases collection efficiencies much higher such as better than 99% (see discussion elsewhere).

For most of the membranes according to the invention, the PF was at least 20 and in some cases even at least 30. Such high values are highly advantageous as they allow for very low penetration at relatively low pressure loss. Lower pressure loss results in lower energy costs to transport air through a filter. This has beneficial effects for the environment (less energy and less $CO_2$) as well as reduced cost of use.

BRIEF DESCRIPTION OF THE DRAWINGS

The invention will be explained more fully below with reference to exemplary embodiments as well as the drawings, in which.

DETAILED DESCRIPTION

Figure 1:
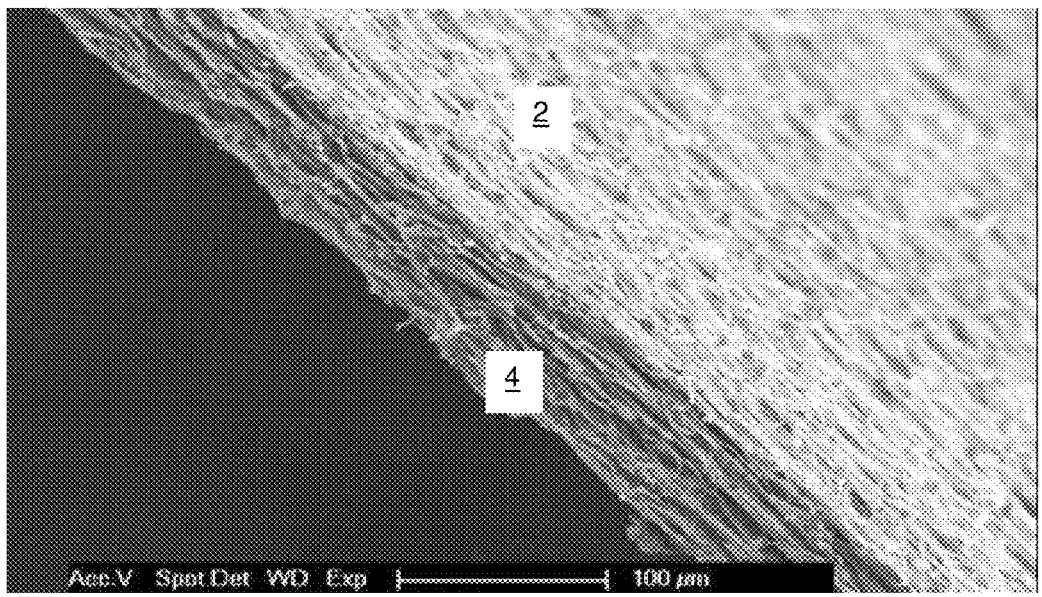
FIG. 1 shows a perspective view of a membrane according to the invention.

The pressure loss over the membrane depends to a large extent on pore size and the structure of the membrane. It was found to be highly advantageous to have a membrane where the pressure loss according to U.S. Military Standard MIL-STD-282 (1956)) is at least 3 mm $H_2O$ when the air is passed through the membrane at a flow velocity of 5.3 cm/sec. This ensures that a very high collection efficiency is realized for the PF values of the membranes according to the invention. Preferably, the pressure loss should be at least 4 mm $H_2O$ when the air is passed through the membrane at a flow velocity of 5.3 cm/sec. On the other hand, the pressure loss should preferably be limited to less than about 30 mm $H_2O$ when the air is passed through the membrane at a flow velocity of 5.3 cm/sec, as a too high pressure loss requires increased working pressure and hence challenges the mechanical requirements of the membrane.

By being porous is herein meant that the membrane has a plurality of open micro pores. It is preferred that the average pore size is at least 0.5 μm. If the average pore size is much lower than 0.5 μm, then the gas flux through the membrane becomes too low for practical applications. By pore size and average pore size is herein meant (unless otherwise stated) the mean flow pore diameter measured with air flow techniques, as shown in the experimental section below. It was found to be an advantage when the average pore size of at least 1 μm and preferably the average pore size is at least 2 μm to realise a relatively low pressure loss. On the other hand, the porous polyethylene membrane should preferably have an average pore size of less than 15 μm to realise a relatively high collection efficiency. Most preferably, the average pore size should be less than 12 μm, such as less than 10 μm. However, it could be theorised without being limited thereto that the collection efficiency depends to a larger extent on the (anisotropic) structure of the membrane than on the average pore size. It was also observed that membranes with smaller average pore size tend to be less prone to irreversible clogging of the pores. It should be observed that binding or storing of particles inside the membrane during use may in some applications be desirable and in such applications the structure and the initial porosity is highly important and the pore size should not be too low.

The optimum pore size depends to a large extent on the specific application of the membrane and hence various ranges between (and in some cases outside) the high end of the range will be particularly advantageous.

The pores of the membrane should preferably be arranged so that the gas permeation as indicated by the Gurley number is below 5 s/50 ml. The Gurley value is the time it takes for a volume of air to pass through an area of the membrane and it is measured as described in the experimental section. In other words, the lower the Gurley the faster the gas penetration through the membrane. The most desirable range of Gurley numbers (i.e. the optimum combination of highest and lowest Gurley numbers) depends on the actual application. In general, it was found to be advantageous when the Gurley number is below 5 s/300 ml. On the other hand, it was found that a too open structure could lead to reduced collection efficiency, and hence it is preferred that the Gurley number is more than 0.5 s/300 ml, and more preferred that the Gurley number is more than about 1 s/300 ml.

By total dry weight is herein meant the weight of the membrane unless stated otherwise.

The polyethylene may be a single polyethylene or—preferably—a mixture of polyethylenes or copolymers thereof and optionally other components discussed below. Hence, it should be observed that by a polyethylene membrane is herein meant a membrane comprising at least 50 wt-% polyethylene, preferably at least 80 wt-% polyethylene. The membrane may consist of polyethylene. The polyethylene preferably has a relatively high average molecular weight to increase the strength of the membrane. A high content of ultra-high molecular weight polyethylene (hereinafter UHMWPE) is advantageous in facilitating manufacturing of free-standing membranes. In one embodiment, at least 20 wt-% of the porous polyethylene membrane is UHMWPE and preferably at least 50 wt-% of the polyethylene is ultra-high molecular weight polyethylene (hereinafter UHMWPE), as UHMWPE allows for very high strength through stretching of the membrane. UHMWPE is polyethylene with a weight average molecular weight of more than about 500,000 g/mole, such as 500,000-20,000,000 g/mole. The lower limit corresponds to the required (lower) tensile strength of the membrane whereas the upper limit corresponds to an approximate limit where the material becomes too rigid to process easily. The UHMWPE may be a bi-modular or a multi modular mixture, which increases processability. A membrane based on UHMWPE has the advantage that it is highly dimensionally stable, also under stress, and that thin microporous membranes with high porosity can be made. Particularly, it was found that a high content of UHMWPE is advantageous as UHMWPE may be processed by extrusion and afterwards being stretched to form a very strong and affordable membrane as well as a membrane that is both chemically and mechanically stable (e.g. with regard to thermal cycling and swelling behavior) even when blended with a fraction of another component. Furthermore, in a preferred embodiment, less than 80 wt-% of the porous polyethylene film is UHMWPE and more preferably less than 70 wt-% of the porous polyethylene film is UHMWPE.

Another highly preferred fraction of polyethylene is high molecular weight polyethylene (hereinafter HMWPE). HMWPE is polyethylene with a weight average molecular weight of about 100,000 g/mole -500,000 g/mole. The lower limit of molecular weight corresponds to the molecular weight where substantial strength increase may be realized by stretching and the upper limit of molecular weight corresponds to the transition to UHMWPE. In one embodiment, at least 5 wt-% of the porous polyethylene film is HMWPE and preferably at least 20 wt-% of the porous polyethylene film is HMWPE, such as at least 30 wt-% of the porous polyethylene film. The content of HMWPE increases the processability and allows for fine tuning of for example pore size and membrane structure of the membrane as compared to pure UHMWPE membranes. Furthermore, it is preferred that less than 80 wt-% of the porous polyethylene film is HMWPE, such as less than 50 wt-% of the porous polyethylene film is HMWPE as a too high content of HMWPE may lead to reduced mechanical strength of the membrane. However, such membranes may still be usable for example for supported membranes.

It should be observed that (U)HMWPE is a clean material with good chemical resistance and PE has the advantage over PTFE that it does not contain fluorine or emit (for example by burning a disposable air filtration unit) fluorine to the environment.

In one embodiment, the porous polyethylene film comprises at least 50 wt-% polyethylene and preferably a total of 1-50 wt-% of at least one component selected from the group consisting of metal, metal oxide, ceramic powder, oxidized PE, PEO, PTFE, micronized wax blends, PE copolymers (such as PE-PTFE, PE-EVA, PE-AA, PVA, PE-vinylchloride or PE-epoxy), activated carbon, carbon black, polymeric resins other than PE, and combinations thereof. The other components may be added to promote desired properties, such as for example provide electrical conductivity, change colour, strength, toughness, reduce cost, increase flexibility, modify hydrophobicity, introduce hydrophilicity, or as fillers. Preferably, the porous polyethylene film comprises at least 85 wt-% polyethylene and a total of 1-15 wt-% of at least one component selected from the above group. Besides, during the above described blending, these components may also be added to the polyethylene membrane via for example a coating or a plasma polymerisation process. Adding additives in the polyolefin porous membrane can be advantageous. For example, additional carbon fibers, nanotubes, glass fibers or other fibers can be beneficial for the conductivity and/or reinforcement of a porous polymer membrane, thereby allowing for increased freedom of design and/or increasing the lifetime of such materials.

The final membrane may take any known membrane shape, such as tubes, sheets, pleated and spiral wound. Particularly, preferred shapes are sheet-like members. Such members may for example be used in a substantially flat shape or be folded into tubes having one or more layers of membranes or into members having a pleated (harmonica-like) surface.

It is preferred that the member is freestanding also referred to as self-supporting, i.e. capable of itself providing sufficient support strength to carry the weight of the membrane as well as the force exerted on the membrane during use. For membranes comprising UHMWPE this embodiment is the most preferred embodiment, as UHMWPE due to the high strength and stiffness allows for design of relatively thin membranes despite the more severe mechanical requirements of freestanding membranes. In another preferred embodiment, the membrane is arranged at least partially on a support member so that the membrane forms a flat main surface, a tubular main surface and/or pleated main surface.

In many applications, the membrane according to the invention is arranged in a module, such as a filtration module, comprising the membrane itself (often shaped two- or three-dimensionally according to the specific needs of the applications by means well known in the art). Well know examples pleated membrane modules. Preferred arrangements of the membrane are discussed elsewhere in the present description. The module further comprises a support and/or frame to protect the filter or to enhance handling of the filter. The support is typically of the type described for supported membranes. Such support may also be used for otherwise free standing membranes as a further precaution against mechanical damage during use. The frame typically has an outer shape that facilitates handling as well as fitting with the system in which the module is utilized, thereby improving the ease of installation/replacement of the membrane in the module or of the module in the system. In such a module, the membrane is the essential element by providing the means for the separation process in which the membrane is to be utilized.

The porous polyethylene membrane may also comprise at least one component selected from the group of flame retardants, fillers, electrical conducting materials, anti fouling additives, and anti odor additives. Specific examples of these additives are known to the person skilled in the art. The content of these additives are typically low such as less than 20 wt-% and preferably less than 10 wt-%. The additives are preferably added prior to extrusion or molding of the membrane, but in some cases (for example with regard to anti odor additives, the additive may be added after shaping of the membrane and in some cases even during the use of the membrane.

During manufacturing, the membrane components are typically mixed with a solvent. A number of solvents are possible, but it was found that the use of decaline facilitated reaching a suitable combination of membrane properties, such as processability, pore size, homogeneity of the mixture and extractability of the solvent after extrusion. Other examples of usable solvents are a-polar or low-polar solvents or mixtures of solvents comprising decaline and/or other aliphatic or aromatic solvents, parafine (oil) and/or other oils, or alcohols or ethers with long chains.

It is highly preferred that the porosity is not evenly distributed. The most favorable structure is for the membrane to have a layered structure of fibril webs arranged substantially parallel to an outer main surface of the membrane, herein referred to as multi layered structure or lasagna-like structure due to the visual similarity of the arrangement of the fibril webs with the pasta sheets in lasagna, where the fibril webs touch adjacent fibril webs in some areas and are separated by another matter (for example air, solvent or water phase) in other areas. The structure of the membrane may be examined by scanning electron microscope of cross sections prepared by freezing the membrane in liquid nitrogen followed by breaking by impact of a knife. The crack extending from the tip of the blade (not touched by the knife) forms a suitable sample for the investigation. In FIG. 1, a SEM micrograph of a typical cross section of a polyethylene membrane according to the invention is shown. The surface, 2, and the cracked cross section, 4, of the highly porous membrane are clearly observed.

Figure 2:
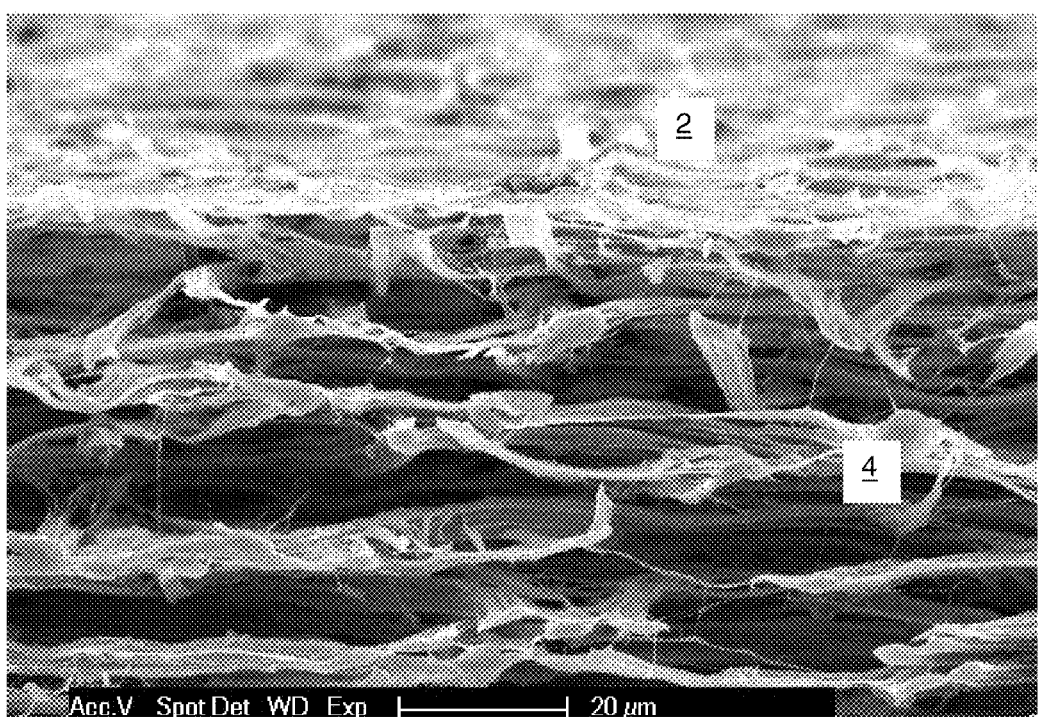
FIG. 2 shows a cross section view of the membrane according to the invention.

The multi layered structure arises due to the preparation method of the membrane and hence connected to the fact that the membrane is prepared by blending followed by extrusion and stretching. The multi layered structure is highly advantageous for a range of separation applications, and it is highly surprising that the multi layered structure could be utilized for gas filtration media, HEPA filters, ULPA filters etc. For example, it has been found that membranes with the multi layered structure as described herein, provides superior filtration properties. It could be theorized without being limited thereto, that this is due to the highly tortuous pore structure, which forces the gas to follow a relatively long path through such membranes. It is hence so much more surprising that despite the highly layered structure and hence highly tortuous pore structure, very low air resistance could be realized as described elsewhere, which leads to a unique combination of high air flow rates and high efficiency of filtration. In FIG. 2, a SEM micrograph of a cross section of a porous membrane according to the invention clearly demonstrates the multilayered structure also referred to as a lasagna structure.

The density of the fibril webs of the multi layered structure may vary and depend on the thickness of the individual webs and the overall porosity of the membrane. In one embodiment, the membrane has 3 to 15 fibril webs/30 μm of membrane cross section, the fibril webs being arranged substantially parallel to an outer surface of the membrane. However, it is preferred that a cross section of the membrane has 4 to 12 fibril webs/30 μm, and it was found to lead to the most desired combination of properties when the cross-section of the membrane has 6 to 10 fibril webs/30 μm of membrane cross section.

The thickness of the individual fibril webs of the multi layered structure may also vary and depend on the density of webs of the webs and the overall porosity of the membrane. In one embodiment of the membrane according to the invention, at least 70% of the fibril webs have a thickness of 0.02 to 2.5 μm parallel to an outer surface of the membrane. It was found to lead to the most desired combination of properties when at least 90% of the fibril webs have a thickness of 0.02 to 2.5 μm.

Figure 3:
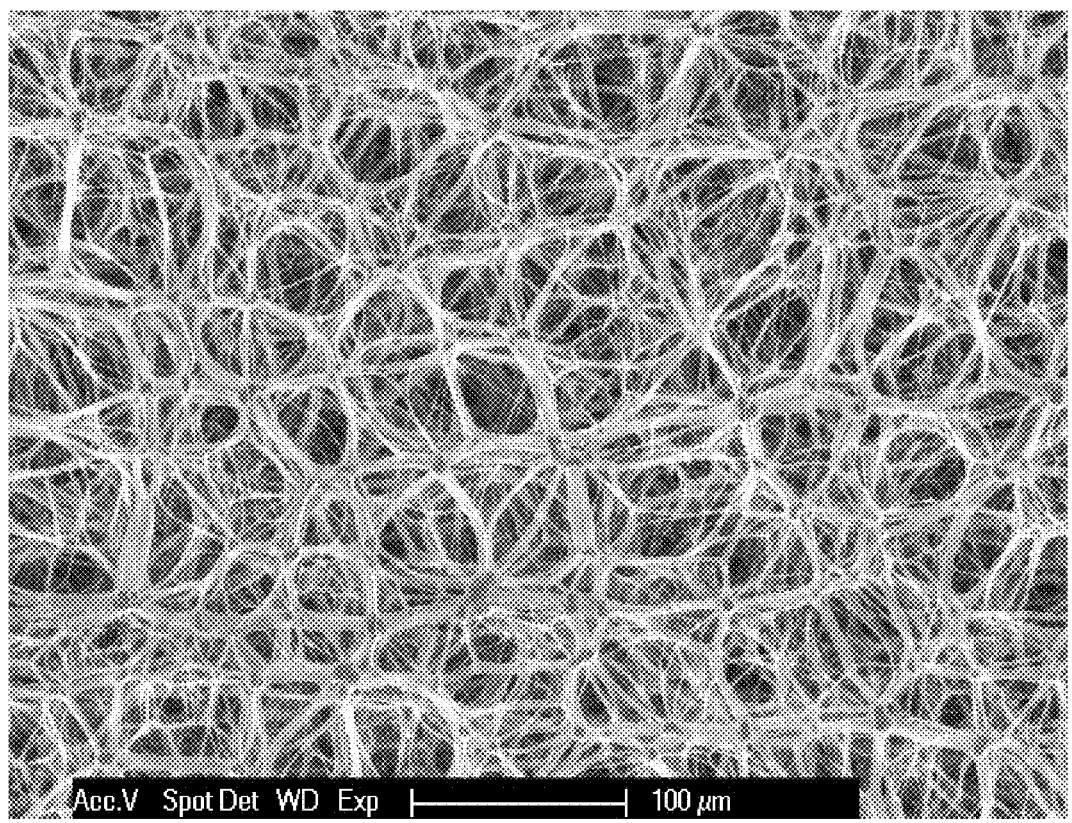
FIG. 3 shows a top surface view of the membrane according to the invention.
Figure 4:
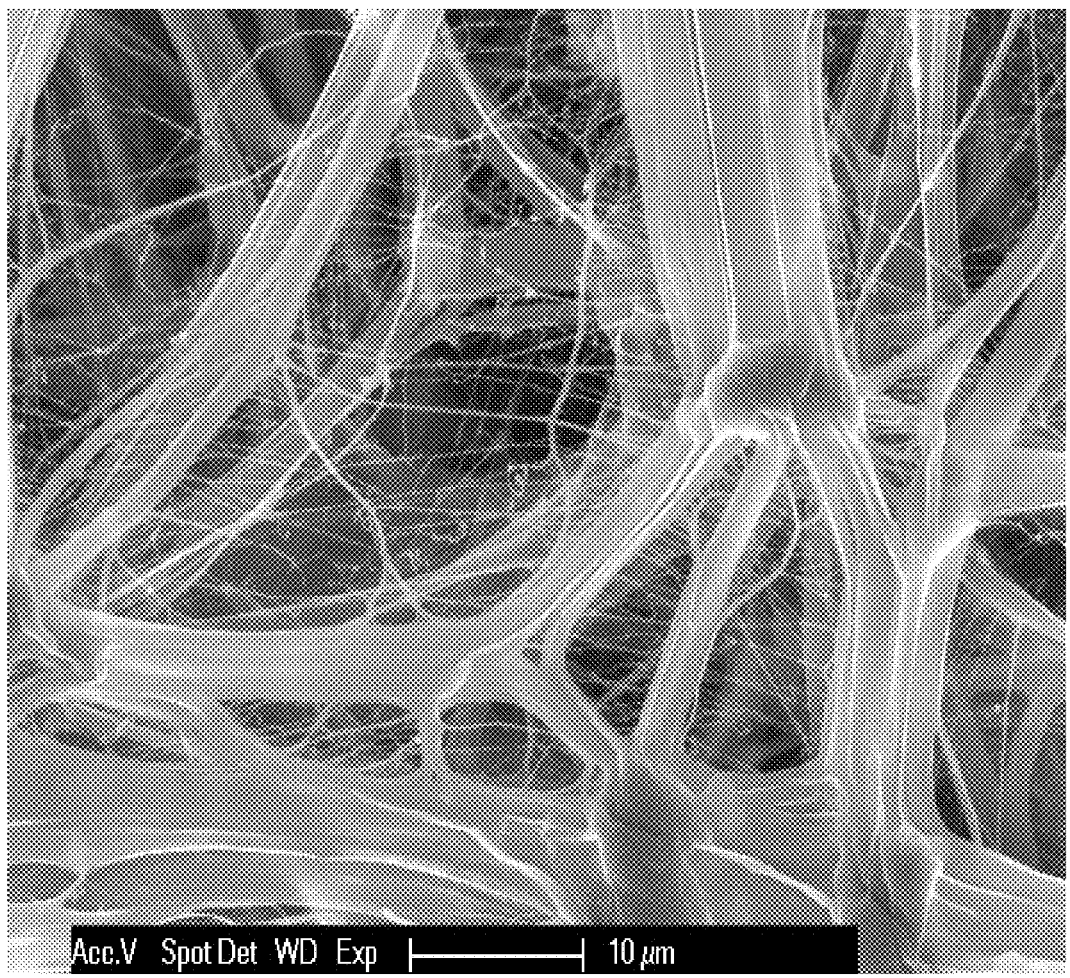
FIG. 4 shows a section of FIG. 3 at higher magnification.
Figure 5:
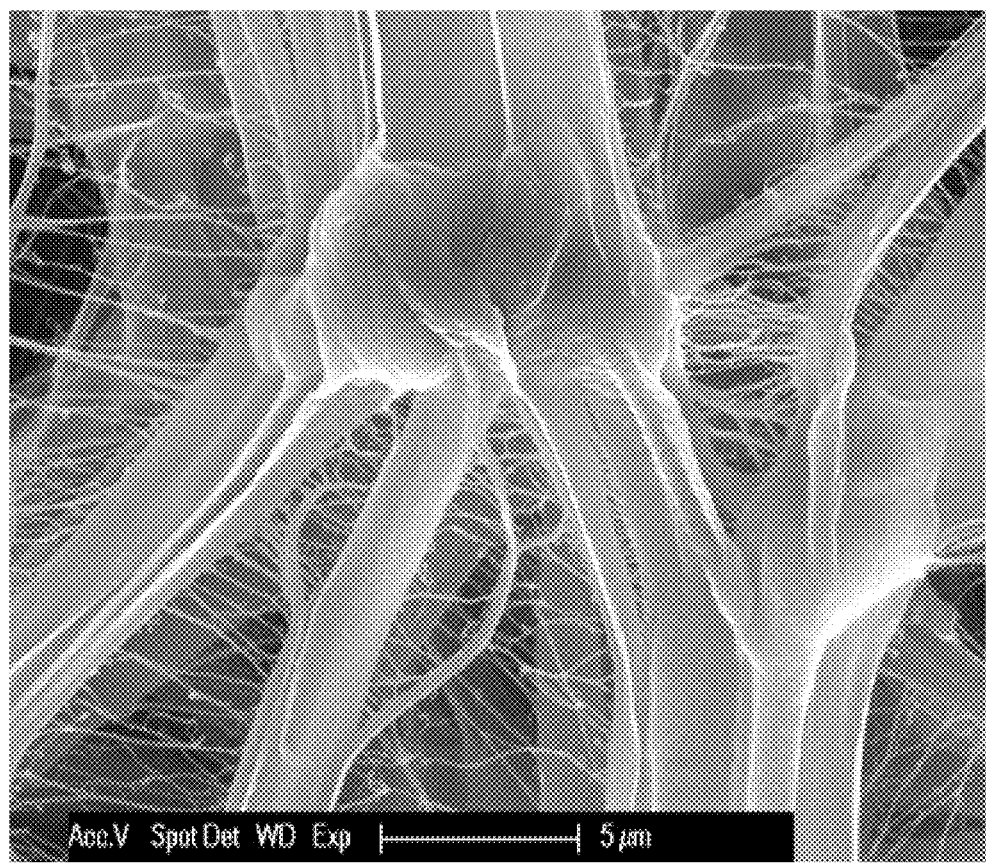
FIG. 5 shows a section of FIG. 4 at higher magnification.

In a highly preferred embodiment, the membrane is a stretched polyethylene membrane having a combination of microfibers with internal nanofibers. The microfibers have a size of about 1-10 μm in diameter and length of 5-50 μm, and the nanofibers have a size 10-150 nm in diameter and 2-20 μm in length. By the diameter of the fiber is herein meant that the average diameter of the fiber is within this range. By the length of fiber is herein meant that the average length of the fiber is within this range. The combination of microfibers and nanofibers is highly advantageous in that the microfibers typically provide the mechanical strength and rigidity, which allows for manufacturing of self supported membranes having very low pressure loss, ΔP, across the membrane. The nanofibers allow for capture of particles as small as about 0.01 μm thereby improving the efficiency of the membrane. In addition to this, the multilayered structure improves filtration efficiency and most important filtration consistency even further for the membrane. In FIG. 3, a SEM micrograph of the surface of a polyethylene membrane according to the invention is shown. On this low magnification micrograph, the network of microfibers is clearly visible, whereas the nanofibers are merely indicated as lighter shades. In FIG. 4 and FIG. 5, a section of FIG. 3 is shown at higher magnification. The stretched polyethylene membrane clearly has a combination of microfibers and internal nanofibers. The nanofibers are clearly shown as fine white lines connecting the more course web of microfibers, connecting individual nanofibers and connecting nanofibers to the microfibers.

Figure 6:
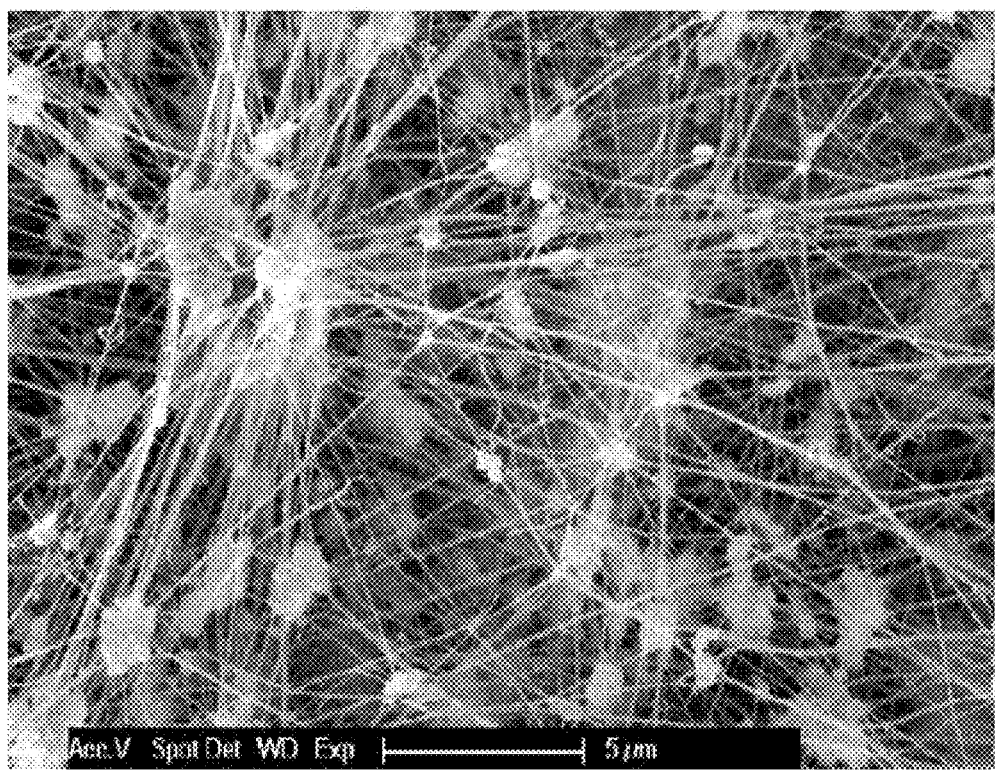
FIG. 6 shows a top surface view of a typical ePTFE structure.
Figure 7:
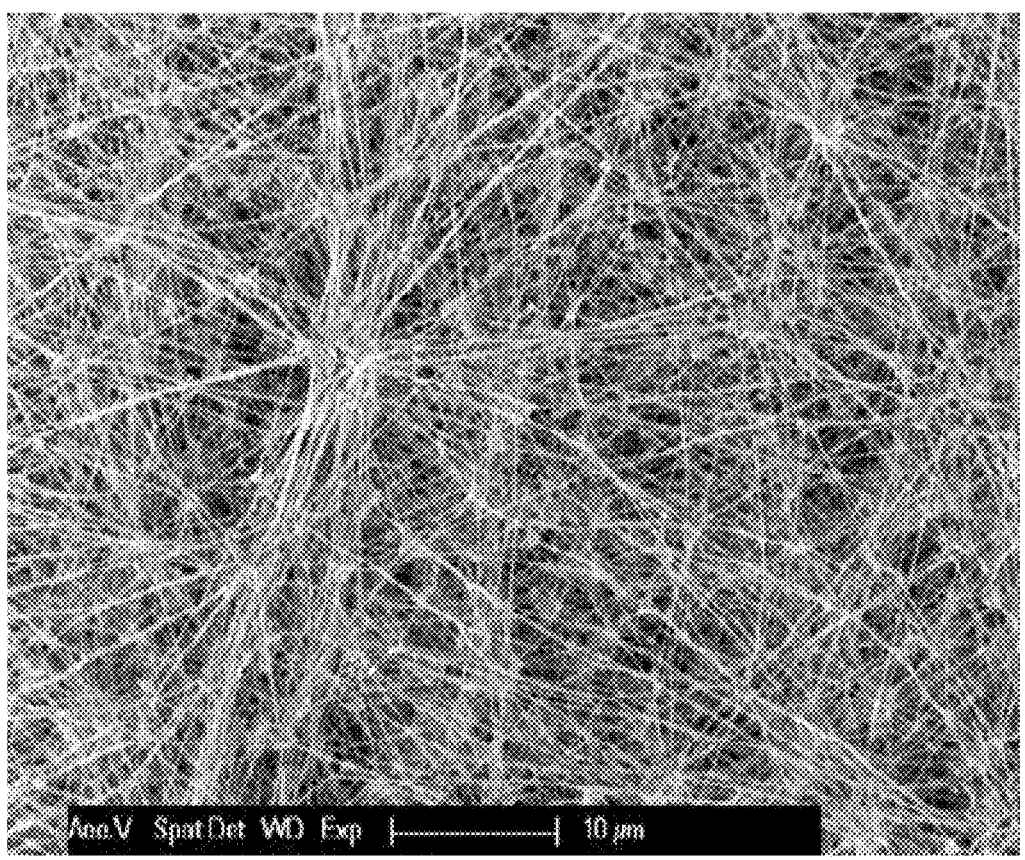
FIG. 7 shows a section of FIG. 6 at higher magnification.

In FIG. 6 and FIG. 7, SEM micrographs of a state of the art ePTFE (extended polytetrafluoroethylene) membrane is shown. When comparing FIG. 4 and FIG. 6, the difference in the structures of (U)HMWPE and ePTFE is clearly visible. The ePTFE has a quite uniform fiber thickness of about 0.1 μm, mixed with ePTFE particles of 1-3 μm diameter. Furthermore, when comparing FIG. 5 to FIG. 7, it is observed that, the ePTFE fiber system is highly uniform with respect to the fibril density, whereas the (U)HMWPE shows a vast variation having both microfibers and nanofibers.

It was found that the porosity of the membrane should be relatively high. The porosity for is defined as $(1-BW/(rho \times d))*100\%$, wherein BW is the base weight of the membrane [in $g/m^2$], rho the density of the membrane [in $g/m^3$] and d the thickness of the membrane [in m]. For some applications, where the gas flow is limited, a porosity of about at least 70 vol-% is advantageous. In most cases, having a porosity of at least 80 vol-% or even at least 90 vol-% would be very useful, as this provides a very open structure, with high overall porosity and hence relatively low pressure loss. The maximum porosity depends on the choice of material and the construction of the system (for example if the membrane is supported or not supported). It was found to be preferred that the porosity of the membrane is at most 95 vol-%, and more preferred that the porosity is at most 90 vol-%.

It is highly preferred that the porosity is not evenly distributed. The most favorable structure is for the membrane to have a multi layered structure of fibril webs arranged substantially parallel to an outer main surface of the membrane. The structure of the membrane may be examined by scanning electron microscope of cross sections prepared by freezing the membrane in liquid nitrogen followed by breaking by impact of a knife. The crack surface extending from the tip of the blade (not touched by the knife) forms a suitable sample for the investigation.

The fibril webs are formed by non-woven polymer fibrils of the polyolefin polymer. The webs are themselves porous but with a porosity much lower than the overall porosity of the membrane. The polyolefin polymer(s) are forming the individual fibril webs. The multi layered structure arises due to the preparation method of the membrane involving mixing, followed by extrusion and stretching. Surprisingly, it was found that the multi layered structure is highly advantageous for gas filtration due to a high flux realized in membrane and a high Collection efficiency despite the very open structure with high porosity.

The density of the fibril webs of the multi layered structure may vary and depend on the thickness of the individual webs and the overall porosity of the membrane. In one embodiment, the membrane has 1 to 12 fibril webs/30 μm of membrane cross section, the fibril webs being arranged substantially parallel to an outer surface of the membrane. However, it is preferred that a cross section of the membrane has 2 to 8 fibril webs/30 μm, and it was found to lead to the most desired combination of properties when the cross-section of the membrane has 2 to 5 fibril webs/30 μm of membrane cross section.

The thickness of the individual fibril webs of the multi layered structure may also vary and depend on the density of the webs and the overall porosity of the membrane. In one embodiment of the membrane according to the invention, at least 70% of the fibril webs have a thickness of 0.02 to 2.5 μm parallel to an outer surface of the membrane. It was found to lead to the most desired combination of properties when at least 90% of the fibril webs have a thickness of 0.02 to 2.5 μm.

The final membrane may take any known membrane or filter shapes. Particularly, preferred shapes are sheet-like members. Such members may for example be used in a substantially flat shape or be folded into tubes having one or more layers of membranes or into members having a pleated (harmonica-like) surface. A particularly preferred shape is used for mini-pleats type filters or filter packs comprising spacers of for example polyamide hot melt resin. In another embodiment, the membrane is a hollow member, i.e. a shape that may be obtained by extrusion through a die having an insert, such as a hollow tube, a hollow box or a hollow fiber. These preferred shapes allow for a very versatile design of the final member comprising the membrane.

It is preferred that the porous polyethylene membrane is freestanding also referred to as self-supporting, i.e. capable of self providing sufficient strength to carry the weight of the membrane as well as the force exerted on the membrane during use. It is quite surprising that it was possible to manufacture freestanding polymeric membranes, as prior art polymeric membranes (PTFE membranes for air filtration) are too fragile to realize this. For membranes comprising UHMWPE, this embodiment is the most preferred embodiment, as UHMWPE due to the high strength and stiffness allows for the design of relatively thin membranes covering the severe mechanical requirements of freestanding membranes.

In another preferred embodiment, the membrane is arranged at least partially on a support member so that the membrane forms a flat main surface, a tubular main surface and/or pleated main surface. A tubular main surface may for example be obtained by spiral winding of one or more layers of a membrane according to the invention or by extruding a tube optionally followed by stretching for example by pressurized air or liquid.

In one embodiment, the membrane has an air-permeable support member laminated on at least one surface of said membrane and preferably air-permeable support members are laminated on both surfaces of the porous polyethylene membrane. The air-permeable support may be micro porous, porous or even macro porous (such as a grid). Laminating an air-permeable support member to the membrane improves the handling of the membrane as well as increase the strength. Support member(s) are for example made from fiber material of a weight in the range of about 10 g/m$^2$ to 400 g/m$^2$ and selected from the group including glass, melt blown polypropylene (PP), polybutylene terephthalate (PBT), polyphenylene sulfide (PPS), expanded polytetrafluoroethylene (ePTFE), ethylene-chlorotrifluoroethylene (ECTFE) polyethylene terephthalate (PET) polyester and polyethylene (PE), Nylon (PA), mixed cellulose ester, cellulose or derivatives thereof, polyvinylchloride and cellulose triacetate. Support member(s) and membrane in the laminate can for example be bonded to each other by ultrasonic welding, gluing, thermo bonding or by laser welding. In a highly preferred embodiment, the support is electrically conductive and/or antistatic.

In many applications, the membrane according to the invention is arranged in a module, such as a filtration module comprising the membrane itself (often shaped two- or three-dimensionally according to the specific needs of the applications by means well known in the art). Well known examples of filtration modules are spiral wound membrane modules or pleated membrane modules. Preferred arrangements of the membrane are discussed elsewhere in the present description. A typical module further comprises a support and/or frame to protect the filter or to enhance handling of the filter. The support is typically of the type described for supported membranes. Such support may also be used for otherwise free standing membranes as a further precaution against mechanical damage during use. The frame typically has an outer shape that facilitates handling as well as fitting with the system in which the module is utilized. In such a module, the membrane is the essential element by providing the means for the separation process in which the membrane is to be utilized.

A preferred example of such modules is an air filtering pack comprising a pleated membrane according to the first aspect of the present invention and optionally a support and/ or a matrix member. The air filter pack should have a PF value exceeding 10 as this provides a very good balance between pressure loss and penetration. Preferably, the PF value of the air filter pack is at least 20, and most preferably the PF value of the air filter pack is at least 30 as this allows for superior overall performance of systems where the filter pack may be used.

In most applications, the membrane forms part of a larger system, such as a system for clean rooms (or a ventilation/air filtering system for a clean room, an apparatus etc.). In some cases, the membrane is arranged in a module (as described elsewhere) but in all cases, the membrane is an essential feature of the whole system by providing properties or functions of the system that are essential for the functioning of the whole system. For example, a clean room without proper air filtration would be completely useless due to contamination, and a medical apparatus is useless if the required air filters are not in place as this would allow the contamination of the apparatus or even the transfer of disease from one patient to another.

A preferred membrane has a thickness of about 200 µm or less, preferably about 75 µm or less, such as less than 50 µm. A thinner membrane has the advantage of potentially lower pressure loss. Preferably, the membrane has a thickness of at least 5 µm and preferably a thickness of at least 10 µm, such as at least 25 µm. The thicker membrane provides increased reliability and strength. Furthermore, freestanding membranes typically require higher thickness than required for supported membranes.

The membranes according to the invention may be manufactured by several methods. In a preferred embodiment, the hydrophilic porous polymer membrane according to the invention is manufactured by mixing at least one polyethylene, preferably at least one of UHMWPE and HMWPE, and optionally additional component(s) as discussed elsewhere with a solvent to form a mixture. Then, the mixture is extruded and the solvent is removed. Preferably, the solvent is removed by evaporation before stretching of the base member. In this way, a base member is created with a unique porous structure, which enhances the formation of the highly advantageous layered structure of fibril webs in the final stretching operation.

The preferred embodiments with regard to for example components and ranges are the same for this embodiment of the invention previously mentioned and are hence described elsewhere in the present description. Further aspects regarding the manufacturing are known in the art and described for example in U.S. Pat. Nos. 5,376,445, 5,370,889 and 5,507,993 (incorporated herein by reference).

The mixture may be a highly viscous liquid typically in the form of a gel or an emulsion. The term extrusion as used herein encompasses the extrusion techniques known in the art, such as gel techniques, solvent extrusion, etc. In one embodiment, the blend is formed inside an extruder, such as an extruder with one or more screws, to process the blend into a highly viscous mass, such as a gel or an emulsion, which mass is drawn through a die, resulting in a thick tape. Solvent is removed from the tape to form a base member by evaporation or extraction. In one embodiment of the method, the solvent is removed after the stretching.

The base member prepared as described above may be used directly as a membrane according to the invention, and is hence itself a membrane according to the invention. However, to increase specific strength, porosity, pore size and to reduce the cost per area of the membrane, the base member is preferably stretched by a factor of at least 10 by area to form the membrane. The stretching may be conducted batch wise or continuously. It was found to be advantageous to stretch biaxially by a factor of 2.5-10 in the machine direction and a factor of 3-10 in the transverse direction as this tended to lead to a suitable combination of membrane properties. Surprisingly, it was found to be highly advantageous to conduct the stretching in the machine direction at a relatively slow rate. Typically, a biaxially stretched a membrane according to the invention comprising UHMWPE exhibits a tensile strength in the machine direction of about 7 MPa or higher, preferably about 10 MPa or higher. In case a very high strength is required, the membrane can have a tensile strength of about 40 MPa or higher typically realized by calendaring of the membrane or the base material. Another way of increasing the tensile strength is to use paraffin oil as a solvent during the extrusion followed by removal of the paraffin oil by extraction. The high strength allows for much thinner membranes and/or membranes that do not require rigid support during use. However, calendaring (as well as the use of paraffin oil as a solvent) also tended to increase the pressure loss in the membrane. Furthermore, the elongation at break for such polyethylene membranes is typically in the order of 10-30% in the machine direction. This allows for a substantial (elastic) deformation during use without deteriorating the performance of the membrane.

The solid content of the mixture prior to extrusion is important for the processability of the membrane as well as the properties of the final membrane. A good combination of features was obtained when the dry content in the blend (i.e. the sum of polyolefin polymer and optional additives) was about 5 to 30 wt-% of the total weight of the dry content and the solvent. However, the best combination of features was realized when the dry content of the blend was about 10 to 25 wt-% of the total weight of the dry content and the solvent. Additives are functional compounds such as for example rheology modifiers (such as oils), colorants and fillers (i.e. passive elements added for example to reduce weight or cost of the membrane). Additives may for example be added in the mixture to increase processability or to affect the properties of the final membrane. Additives may also be added after stretching for example as a chemically or physically bonded coating.

The way of processing (extrusion/stretching) is much more favorable than the traditional solvent casting method to produce membranes. Solvent cast membranes require a high cost and very well defined flat support for making the casting equally over the surface, in order to obtain a consistent film thickness. The method described in the present embodiment does not need a support for making a membrane, or if required can use a low cost support, like a non-woven support.

The porous polyethylene membranes of the present invention can be used in a large number of applications where gas filtration is required.

In preferred embodiments of the invention, the porous polyethylene membrane is used for particle filtration of a gas in a HVAC unit, a clean room (for new air, recycled air or exit air, in a vacuum cleaner, in an air filtering unit or in medical equipment. The gas filter media may be used as filter media for any end-use applications. For example, the gas filter media may be used as a filter media for an end-use application selected from the group consisting of particulate removal from gases, air-filtration application, elevated temperature application, bag house application, particulate filtration in food, medical and pharmaceuticals, particulate filtration in combustion processes, particulate filtration in metals, and particulate filtration in cements. Particulate removal from gases includes industries such as HVAC, HEPA and ULPA clean rooms, vacuum cleaning, respirators, cement, metals, food, medical, pharmaceuticals, processed fluids, and combustion processes.

The required properties depend on the actual application of the membrane. The three main groups of applications are as ASHRAE filters, HEPA filters and ULPA filters. For ASHRAE filters, it is typically required to have an overall collection efficiency of at least 50% and preferably at least 90% when air is flowing through the membrane at a flow velocity of 5.3 cm/second. The collection efficiency is measured using dioctyl phthalate having a particle size of 0.3 μm (corresponding to U.S. Military Standard MIL-STD-282 (1956)). For HEPA filters, it is typically required to have a collection efficiency of at least 99.97%, under the same conditions. For ULPA filters, the collection efficiency should be at least 99.9995% at the most penetrating particle size when air is flowing through the membrane at a flow velocity of 5.3 cm/second. The collection efficiency is measured using dioctyl phthalate having a particle size of 0.3 μm (corresponding to U.S. Military Standard MIL-STD-282 (1956)). It was highly surprising that these requirements could be fulfilled for porous polyethylene membranes according to the invention with a PF value of more than 10.

For air or HEPA filter membranes, the penetration typically varies as a function of the particle size for particles having a size in the range of 0.01-0.3 μm in that the penetration tends to go through a maximum in this range. For the membranes according to the invention, it was observed that the highest penetration in the 0.01-0.3 μm range was for particles having a size of about 0.05 μm, when measured at 5.3 cm/s. This was the case for DOP as well as for DEHS. The particle size at the highest penetration is also called most penetration particle size or mpps. The difference between the penetrations at the mpps and the penetration at 0.3 μm is preferably within a few 10 log scales.

In a preferred embodiment, the membrane was prepared by providing a mixture of a solvent and a polyethylene (optionally with one or more further components as discussed above) followed by extruding a membrane from the mixture and stretching the membrane by at least a factor of 10 by area. The solvent is removed from the membrane before or after the stretching. In this embodiment, it was found to be important that the stretching in the machine direction is at least a factor of 2.5 and that the stretching in the machine direction is conducted at a deformation speed of less than 30 mm/s for an initial size in the machine direction of 70 mm. Preferably, the stretching in the machine direction is conducted at a deformation speed of less than about 25 mm/s for an initial size in the machine direction of 70 mm. More preferably, the stretching in the machine direction is conducted at a deformation speed of less than about 15 mm/s for an initial size in the machine direction of 70 mm, and particularly advantageous is when the stretching in the machine direction is conducted at a deformation speed of less than about 10 mm/s for an initial size in the machine direction of 70 mm. The method should be conducted so as to provide a membrane having a Gurley number of 0.2-5 s/50 ml, a porosity of at least 80% and a pore size of 0.5-15 μm. Surprisingly, it was found, that this way of stretching the base member is one way of realizing a unique porous structure with an open structure and a combination of microfibers and internal nanofibers, which enhances the formation of the highly advantageous layered structure of fibril webs in the final stretching operation.

The membrane filter can readily be prepared on an industrial scale in a batch process or a continuous process. Surprisingly, it was found that the time (stretching speed and the stretching factor) for stretching in the MD direction appears to be an important factor in providing the superior combination of high collection efficiency and extremely low pressure loss.

An individual feature or combination of features from an embodiment of the invention described herein, as well as obvious variations thereof, are combinable with or exchangeable for features of the other embodiments described herein, unless the person skilled in the art would immediately realise that the resulting embodiment is not physically feasible.

Test Methods:
Pore Size

The mean flow pore size, determined with a PMI apparatus, is based on air permeability and uses a wetting fluid. The common mean flow pore size method with the PMI apparatus is based on ASTM F316-03. Samples of 25 mm in diameter were wetted with a low surface tension fluid, type Fluor Inert, FC-40, and placed in a holder. A differential air pressure removes the wetting fluid from the sample. After this wet run, a dry run (dry flow) is applied. PMI software calculates the mean flow pore size by using the differential pressure at which the wet flow is equal to 50% of the dry flow.

Air Permeability:

The Gurley test method (according to ISO 5636-5) covers the determination of the resistance of membranes to the passage of air. The method is applicable to membranes permitting the passage of air up to 50 ml in one second or more. In this test, a Gurley Densometer from Gurley Precision Instruments, type 4110 was used, recording the time with an accuracy of 0.1 seconds; with a cylinder capacity of 50 milliliters, a cylinder weight of 567 gram and a measuring surface of 6.45 square centimeters (1 square inch). After calibration, a strip of a membrane is cut across the width of the roll. Furthermore, a smooth, undamaged test specimen is placed over the clamping plate orifice and clamped. In this air permeability test method, no wetting liquid was used. The measurement is started, and the time is determined with an accuracy of 0.1 seconds, which is required for 50 ml of air to pass through the test specimen. For membranes with very fast gas penetration, the penetration time is measured for higher volumes of air, say 300 ml. Also, a calibrated orifice (from Gurley Precision Instruments) was used, having a restriction of a factor 10. When this orifice was installed, an air volume of 100 ml was applied.

Thickness

The thickness was measured with a Mahr Millitron, with a 12 mm in diameter foot print using 0.5 N tension.

Particle Collection Efficiency Test and Pressure Drop

Particle collection efficiency was measured by an automated tester (Model 8160 from TSI, Inc., St. Paul, Minn.). A 6 inch (152.4 mm) diameter flat sheet sample of the filter medium was enclosed in the filter holder with gasket seals mounted horizontally. The circular filter holder had two zones, a center test zone which allows air flow and test particles to pass through and an outer guard zone to prevent leakage of air flow between the test zone and the atmosphere. The differential pressure between the two zones was adjusted to near zero so that no outside air leaks into the test zone. The test zone had an area of approximately 100 cm$^2$ (11.3 cm diameter) (15 square inch (4.4 inch diameter)). A dioctyl pthalate (DOP) solution was atomized to generate a polydisperse aerosol. The aerosol particles were then classified according to their electrical mobilities to generate monodisperse particles from 0.02 to 0.5 micrometer in diameter. The particles were then passed to the test filter. Two condensation nucleus particle counters simultaneously measured the particle concentrations upstream and downstream of the filter to determine the particle collection efficiency. The efficiency was reported as the percentage of particles collected by the filter relative to the upstream challenge particles.

The pressure drop was recorded in mm of water gauge. The test was performed at a medium face velocity of 5.3 cm/sec.

When the particle collection efficiency of the non-abraded section of each sample was greater than 99%, particles which penetrated the media samples during the efficiency test were assumed to pass through the abraded sections of the samples.

The test was performed at ambient room temperature (70° F.) and humidity conditions (40%). Samples to be tested were not conditioned at specific temperature and humidity conditions prior to testing.

EXAMPLES

The invention will be elucidated with the following, non-limiting examples.

Porous polyethylene membranes were prepared according to the following general method.

A 19 wt-% solution of UHMWPE (9 wt-%) and HMWPE (10 wt-%) with a overall weight average molecular weight of 1.5×10$^6$ g/mole in decaline was extruded at a temperature of about 180° C. The extruder head was fitted with a die with a 1 mm opening. The extruded film was cooled in a quench bath. The solvent was removed from the gel film by evaporation in an oven. The film from which solvent had been removed was simultaneously stretched in machine direction (MD) and transverse direction (TD), at a temperature of about 130° C.

TABLE 1

Preparation and experimental data of polyethylene membranes

| | Base weight [μm] | Stretch speed** TD [mm/s] | Stretch speed** MD [mm/s] | Stretch factor TD [—] | Stretch factor MD [—] | Thickness [μm] | Gurley* [s/100 ml] | Average pore size [μm] | Porosity [%] |
|---|---|---|---|---|---|---|---|---|---|
| 1 | 7.3 | 25 | 25 | 6 | 4.4 | 61.5 | 6.0 | 4.9 | 88% |
| 2 | 8.4 | 5 | 5 | 6 | 4.4 | 97.3 | 4.0 | 6.2 | 91% |
| 3 | 5.8 | 1 | 1 | 7 | 4 | 89.3 | 2.2 | 9.3 | 93% |

*Gurley measured with an 1/10 orifice.
**For a sample with initial stretching area of 70 × 70 mm

TABLE 2

Air filtering properties of polyethylene membranes

| | Penetration [%] | Pressure drop [mm] | Particle Filtration* [—] |
|---|---|---|---|
| 1 | 0.006 | 24.8 | 17 |
| 2 | 0.003 | 15.5 | 29 |
| 3 | 0.037 | 9.0 | 38 |

*Measured using dioctyl phthalate having a particle size of 0.3 μm (U.S. Military Standard MIL-STD-282 (1956)).

From Table 2 it is observed that for nearly equivalent membranes a reduction of the stretching speed leads to a tremendous and highly surprising increase in Particle Filtration.

The invention claimed is:

1. A gas filtration media, comprising a multilayered polyethylene membrane having a particle filtration, PF, value calculated according to the formula: PF=(-log(Penetration (%)/100)/Pressure loss (mm H$_2$O))×100 in which the Penetration (%)=100-Collection efficiency at a Pressure loss (unit: mm H$_2$O) measured when air is flowing through the membrane at a flow velocity of 5.3 cm/second and a collection efficiency (unit: %) measured using dioctyl phthalate having a particle size of 0.3 μm (U.S. Military Standard MIL-STD-282 (1956)), the PF value of the membrane is at least 20, and wherein the membrane has a porosity of at least 88 vol-%, a thickness of greater than 10 μm to less than 200 μm, and an average pore size of at least 0.5 μm, wherein the polyethylene is stretched in a transverse directions by a factor of at least 10 times the area and in the machine direction alone is stretched by a factor of at least 2.5 times the area.

2. Membrane according to claim 1, wherein the membrane is a freestanding membrane.

3. Membrane according to claim 1, wherein the pressure loss according to U.S. Military Standard MIL-STD-282 (1956) is at least 3 mm $H_2O$ and less than 30 mm $H_2O$ when the air is passing through the membrane at a flow velocity of 5.3 cm/sec.

4. Membrane according to claim 1, wherein a Gurley value according to ISO 5636-5 is less than 5 s/50 ml.

5. Membrane according to claim 4, wherein the collection efficiency is at least 90%, when air is flowing through the membrane at a flow velocity of 5.3 cm/second and a collection efficiency (unit: %) measured using dioctyl phthalate having a particle size of 0.3 µm (U.S. Military Standard MIL-STD-282 (1956)).

6. Membrane according to claim 1, wherein said porous polyethylene membrane is a stretched polyethylene membrane having a multi layered structure of fibril webs, wherein a cross-section of the membrane has 1 to 12 fibril webs/30 µm.

7. Membrane according to claim 6 having a combination of microfibers with internal nanofibers, wherein the microfibers having a size of 1-10 µm and length of 5-50 µm and the nanofibers having a size 10-150 nm in thickness and 2-20 µm in length.

8. Membrane according to claim 1, wherein the porous polyethylene membrane comprises at least one component selected from the group consisting of flame retardants, fillers, electrically conducting materials, anti fouling additives, and anti odor additives.

9. Membrane according to claim 1, wherein the porous polyethylene film comprises at least 50 wt-% polyethylene and about 1-50 wt-% of component(s) selected from the group consisting of metal, metal oxide, ceramic powder, oxidized PE, PEO, PTFE, micronized wax blends, PE copolymers, activated carbon, carbon black, polymeric resins other than PE, and combinations thereof.

10. Membrane according to claim 9, further comprising an additive selected from the group consisting of active carbon, carbon black, graphite, high surface area metallic powders, carbon nanotubes, synthetic oxides, naturally occurring oxides, hydroxides and fiber material.

11. Membrane according to claim 1, wherein at least 20 wt-% and less than 80 wt-% of the porous polyethylene film is UHMWPE, and at least 5 wt-% and less than 80 wt-% of the porous polyethylene film is HMWPE.

12. Membrane according to claim 1 having an air-permeable support member laminated on at least one surface of said membrane, wherein the support member is a laminate comprising a nonwoven, woven, spunweb, web and/or grid member, and the support member comprises a material selected from the group consisting of PET, ECTFE, PA, PBT, PPS, PP, PE, ePTFE, UHMWPE, and copolymers comprising any one of these, mixed cellulose ester, polyvinylchloride, cellulose triacetate, ceramic, and glass, and the support member and the membrane being bonded to each other by ultrasonic welding, gluing, thermo bonding or by laser welding.

13. A method of preparing a gas filtration membrane comprising the steps of: providing a mixture of a solvent and a polyethylene optionally with a further component, wherein the polyethylene optionally with the further component is about 5 to 30 weight percent of the total weight of the solvent, extruding a membrane from the mixture, removing the solvent to form a base member, and stretching the membrane by a factor of at least 2.5 to 10 times the original length in a machine direction at a deformation speed of less than 30 mm/s and by a factor of 3 to 10 times the original length in a transverse direction at a speed that provides the membrane for use as a gas filtration media having a PF value of more than 20, a porosity of at least 88 vol-% and an average pore size of at least 0.5 µm.

14. Method according to claim 13, wherein the solvent is removed by evaporation before stretching of the base member.

15. An air filter pack comprising a pleated membrane according to claim 1.

16. Method according to claim 13, wherein the step of stretching the membrane in the machine direction is conducted simultaneously to the stretching in the transverse direction.

17. Gas filtration membrane prepared by a process comprising:
   extruding a solution comprising a polyethylene polymer having a solids content of 10 to 25 weight percent to form a porous multilayered structure;
   stretching the porous polyethylene multilayered structure in a transverse direction by a factor of at least 10 times the extruded width and in the machine direction by a factor of at least 2.5 times the extruded length to form a membrane, wherein the membrane has a particle filtration, PF, value calculated according to the formula: PF= (-log(Penetration (%)/100)/Pressure loss (mm $H_2O$))× 100 in which the Penetration (%)=100-Collection efficiency at a Pressure loss (unit: mm $H_2O$) measured when air is flowing through the membrane at a flow velocity of 5.3 cm/second and a collection efficiency (unit: %) measured using dioctyl phthalate having a particle size of 0.3 µm (U.S. Military Standard MIL-STD-282 (1956)), the PF value of the membrane is at least 20, and wherein the membrane has a porosity of at least 88 vol-%, a thickness of greater than 10 µm to less than 200 µm and an average pore size of at least 0.5 µm.

* * * * *